(12) United States Patent
Yang

(10) Patent No.: US 7,511,466 B2
(45) Date of Patent: Mar. 31, 2009

(54) METHOD AND APPARATUS FOR PREDICTING DISCHARGE TIME OF MAGNETIC DEVICE FOR POWER CONVERTER

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 444 days.

(21) Appl. No.: 11/407,439

(22) Filed: Apr. 19, 2006

(65) Prior Publication Data
US 2007/0247128 A1 Oct. 25, 2007

(51) Int. Cl.
*G05F 1/40* (2006.01)
(52) U.S. Cl. .................. 323/284; 323/285; 323/290; 363/127
(58) Field of Classification Search ............... 363/126, 363/127; 323/225, 282, 284, 285, 290, 351, 323/222, 224
See application file for complete search history.

(56) References Cited

U.S. PATENT DOCUMENTS

| 6,366,070 B1 | 4/2002 | Cooke et al. ............... 323/284 |
| 6,396,250 B1 * | 5/2002 | Bridge ........................ 323/283 |
| 6,841,977 B2 * | 1/2005 | Huang et al. ............... 323/224 |
| 7,166,993 B2 * | 1/2007 | Shimizu et al. ............ 323/282 |
| 2007/0285070 A1 * | 12/2007 | Yang .......................... 323/282 |

* cited by examiner

*Primary Examiner*—Jessica Han
(74) *Attorney, Agent, or Firm*—J.C. Patents

(57) ABSTRACT

A method and apparatus for predicting the discharge time of magnetic device are provided. A switching circuit generates a switching signal and an auxiliary signal. The switching signal is used to regulate the switching regulator. The auxiliary signal is used to control the synchronous rectifier. An evaluation circuit generates a timing signal in response to an input signal and the switching signal. The input signal is correlated to the input voltage of the switching regulator. The timing signal is formed for turning off the synchronous rectifier for preventing a reverse current under light load and no load conditions.

19 Claims, 6 Drawing Sheets

METHOD AND APPARATUS FOR PREDICTING DISCHARGE TIME OF MAGNETIC DEVICE FOR POWER CONVERTER

FIELD OF INVENTION

The present invention relates in general to switching regulator, and more particularly, to the control circuit for switching regulator.

BACKGROUND OF THE INVENTION

Switching regulators are used for converting an unregulated power source to a regulated voltage and/or current source. FIG. 1 shows a traditional switching regulator with synchronous rectification. A first switching signal $S_1$ is utilized to control the duty cycle of a first switch 10 for the regulation of voltage and/or current. As shown in FIG. 2, a current $I_{IN}$ is to charge an output capacitor 40 during the on time of the switch 10. FIG. 3 shows a second switching signal $S_2$ for turning on a second switch 20 in response to the turning off of the first switch 10 for providing a low impedance path for a discharge current $I_F$ of an inductor 30. In continuous current mode (CCM) operation, the first switch 10 is turned on before the energy of the inductor 30 is completely discharged. In the discontinuous current mode (DCM) operation, the energy in the inductor 30 is fully discharged before the start of the next switching cycle. FIG. 4 shows a reverse current $I_R$ discharging the output capacitor 40 through the second switch 20 during the DCM operation. The reverse current $I_R$ will cause power losses and the lowering the switching regulator efficiency at light load and no load conditions. FIGS. 5A and 5B show a plurality of CCM and DCM waveforms, respectively.

Conventional methods for limiting the reverse current in a synchronous rectification circuit include the use of a current sensing circuit for turning off the synchronous rectifier once a reverse current is detected. The current sensing circuit involves the use of the turn-on resistor ($R_{DS}$-ON) of the transistor (synchronous rectifier) or a series resistor for detecting the reverse current. However, these approaches cause power losses and add complexity to the system. Moreover, the synchronous rectifier can only be turned off after the reverse current is generated and detected. Accordingly, a synchronous rectification circuit that eliminates the effects of reverse current without the current sensing circuit would be advantageous.

SUMMARY OF THE INVENTION

The present invention provides a method and apparatus for predicting the discharge time of an magnetic device for switching off the synchronous rectifier before the reverse current has occurred. A switching signal is generated to regulate the switching regulator. An auxiliary signal is used to control the on/off of the synchronous rectifier. An evaluation circuit is utilized to generate a timing signal in accordance with (1) an input signal, (2) a control signal, and (3) the switching signal. The timing signal is used to turn off the synchronous rectifier for preventing a reverse current of the synchronous rectifier under light load and no load conditions. The input signal is correlated to the input voltage of the switching regulator. The timing signal is increased in response to the increase of the input signal. The control signal is set in relationship to the output voltage of the switching regulator. Furthermore, the timing signal is decreased in response to the decrease in the switching signal.

The evaluation circuit comprises an input circuit and a timer circuit. The input circuit generates a charge signal and a discharge signal in accordance with the input signal and the control signal. The timer circuit further generates the timing signal in accordance with the charge signal, the discharge signal, and the switching signal. The charge signal and the switching signal generate a charge voltage. After that, the charge voltage associated with the discharge signal generates the timing signal once the switching signal is turned off.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings, FIG. 1 shows a traditional switching regulator with synchronous rectification.

DESCRIPTION OF THE EMBODIMENTS

Figure 1:
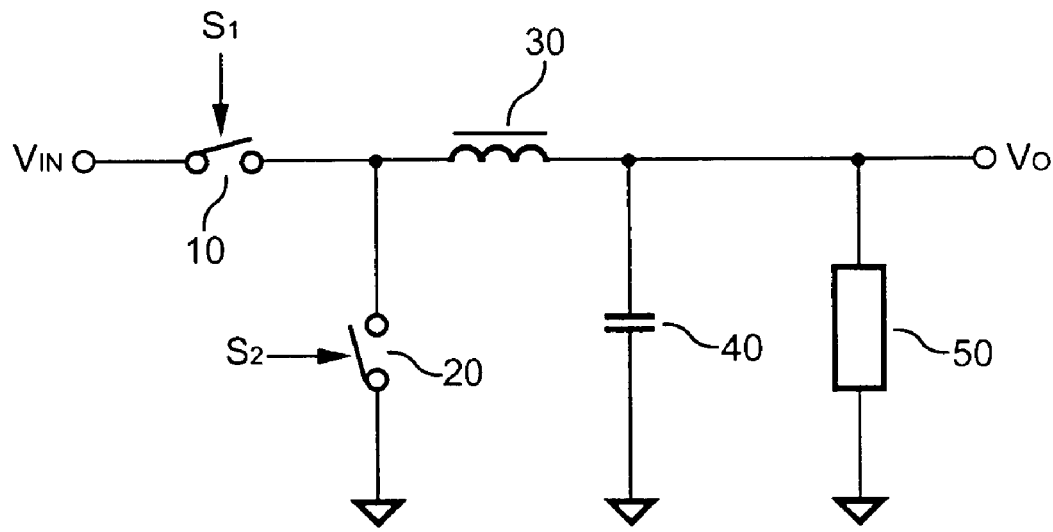
Figure 2:
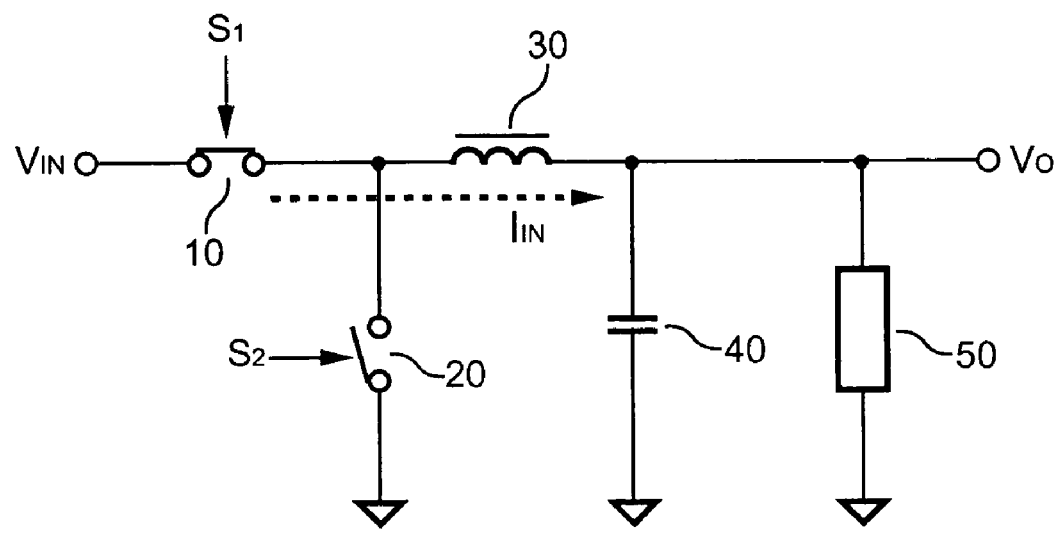
FIG. 2 and FIG. 3 show two operation stages of the traditional switching regulator.
Figure 3:
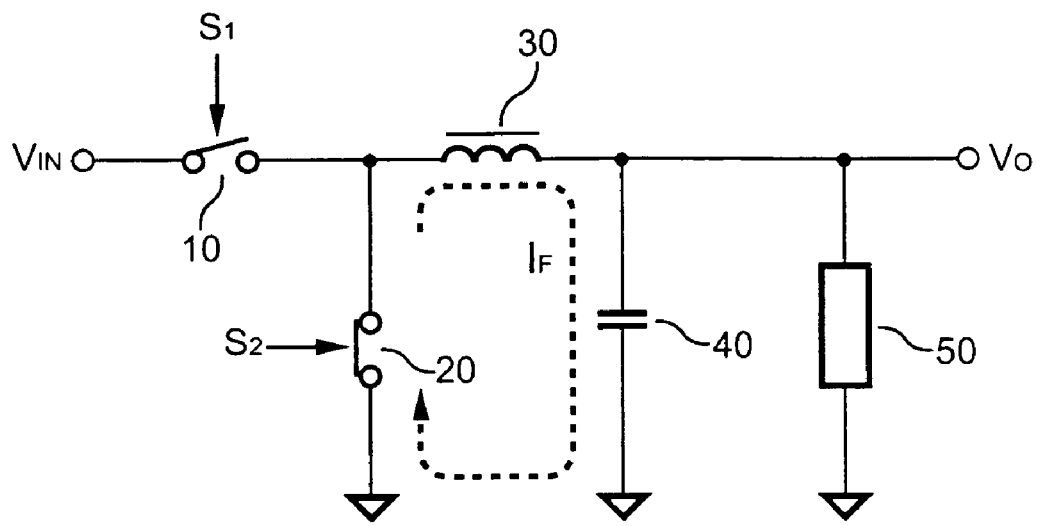
Figure 4:
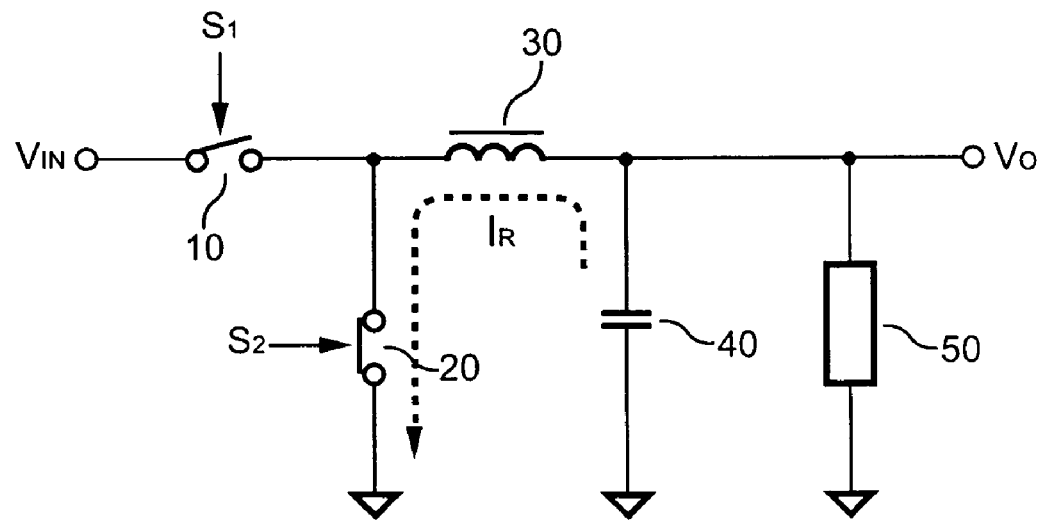
FIG. 4 shows a reverse current under light load and no load conditions for the traditional switching regulator.
Figure 5A:
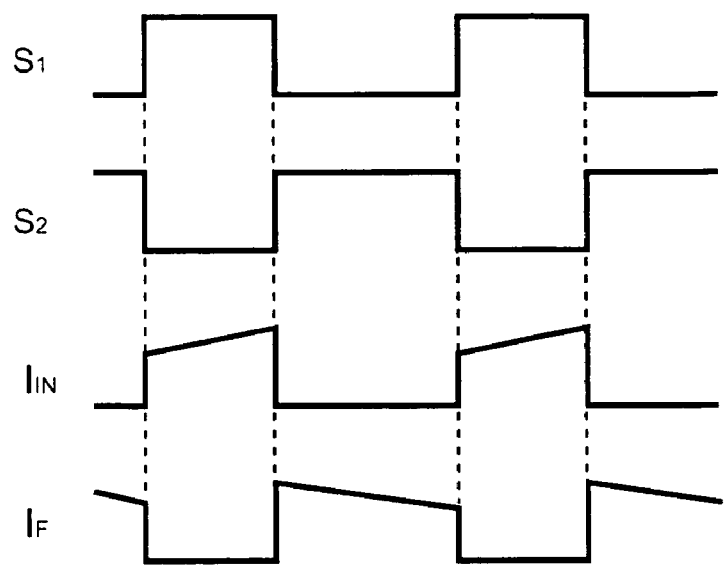
FIG. 5A shows a plurality of waveforms of a switching regulator operated in continuous current mode.
Figure 5B:
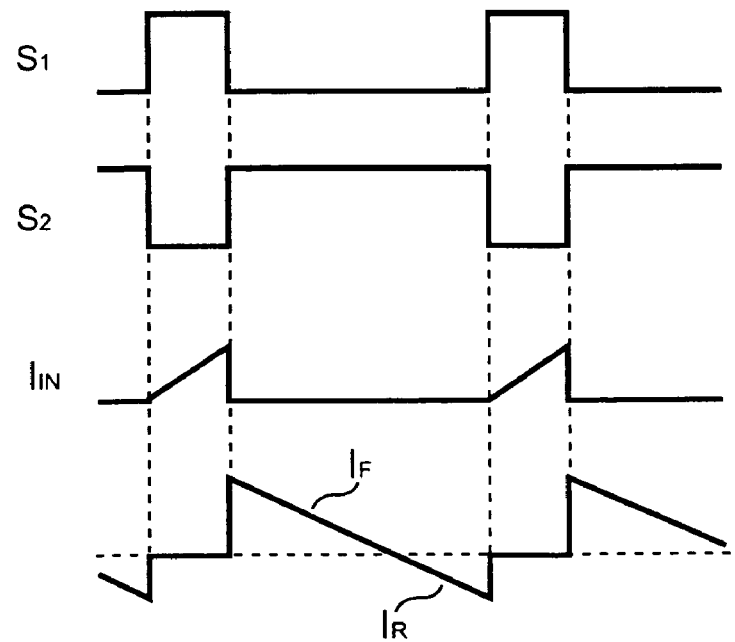
FIG. 5B shows a plurality of waveforms of the switching regulator operated in discontinuous current mode.
Figure 6:
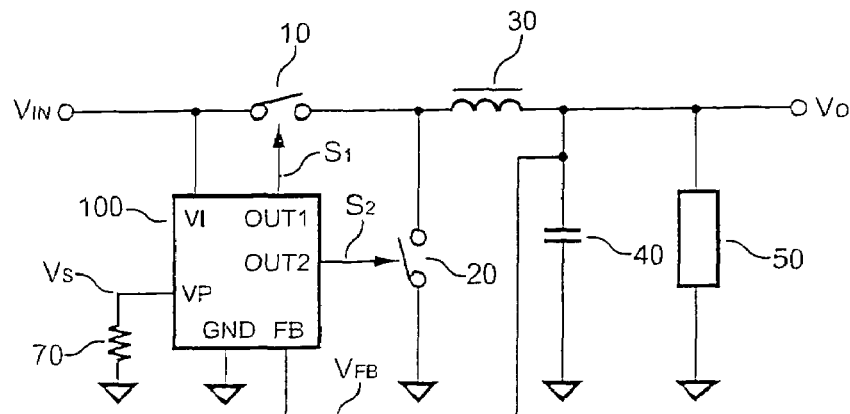
FIG. 6 shows a switching regulator in accordance with a preferred embodiment of the present invention.

FIG. 6 shows a switching regulator in accordance with a preferred embodiment of the present invention. A control circuit 100 is used to generate a first switching signal $S_1$ and a second switching signal $S_2$ to control the switching regulator. The second switching signal $S_2$ controls a second switch 20 to provide a lower-impedance current path for an inductor 30 (a magnetic device) as long as the discharge current of the inductor 30 is present. The second switch 20 is operated as a synchronous rectifier. An input terminal VI of the control circuit 100 is connected to the input of the switching regulator to receive an input voltage $V_{IN}$. A program terminal VP of the control circuit 100 has a resistor 70 connected to ground to program a control signal $V_S$ for predicting the discharge time of the inductor 30 and for producing the second switching signal $S_2$. The control signal $V_S$ can be programmed in accordance to the output voltage $V_O$ of the switching regulator. The control circuit 100 has a feedback terminal FB coupled to the output of the switching regulator for generating the first switching signal $S_1$. The first switching signal $S_1$ thus controls the duty cycle of the first switch 10 for the regulation of voltage and/or current. When the first switch 10 is turned on, a charge current will flow into the inductor 30. Therefore, the on-time TON of the first switching signal $S_1$ represents the charge time of the inductor 30. The charge current is correlated to the input voltage $V_{IN}$, the output voltage $V_O$, the inductance L of the inductor 30 and the on-time TON of the first switching signal $S_1$. Once the first switch 10 is turned off, a discharge current will flow from the inductor 30. The output voltage $V_O$, the inductance of the inductor 30, and the magnitude of the charge current determine the discharge time TOFF. In the continuous current mode (CCM) operation, the first switching signal $S_1$ is enabled before the discharge current is discharged to zero. In the discontinuous current mode (DCM) operation, the discharge current of the inductor 30 is discharged to zero before the start of the next switching cycle. The boundary condition between the CCM and DCM operations is given by $$\frac{V_{IN} - V_O}{L} \times T_{ON} = \frac{V_O}{L} \times (T - T_{ON}) \quad (1)$$

in which T is the switching period of the first switching signal $S_1$. The discharge time TOFF of the inductor 30 can be obtained in accordance with the equation (1), in which TOFF=(T−TON). Refer to equations (2) and (3).

$$V_{IN} \times T_{ON} - V_O \times T_{ON} = V_O \times T_{OFF} \quad (2)$$

$$T_{OFF} = \frac{V_{IN} - V_O}{V_O} \times T_{ON} \quad (3)$$

It shows the discharge time TOFF can be predicted in accordance with (a) the input voltage $V_{IN}$, (b) the output voltage $V_O$, and (c) the on-time of the first switching signal $S_1$.

Figure 7:
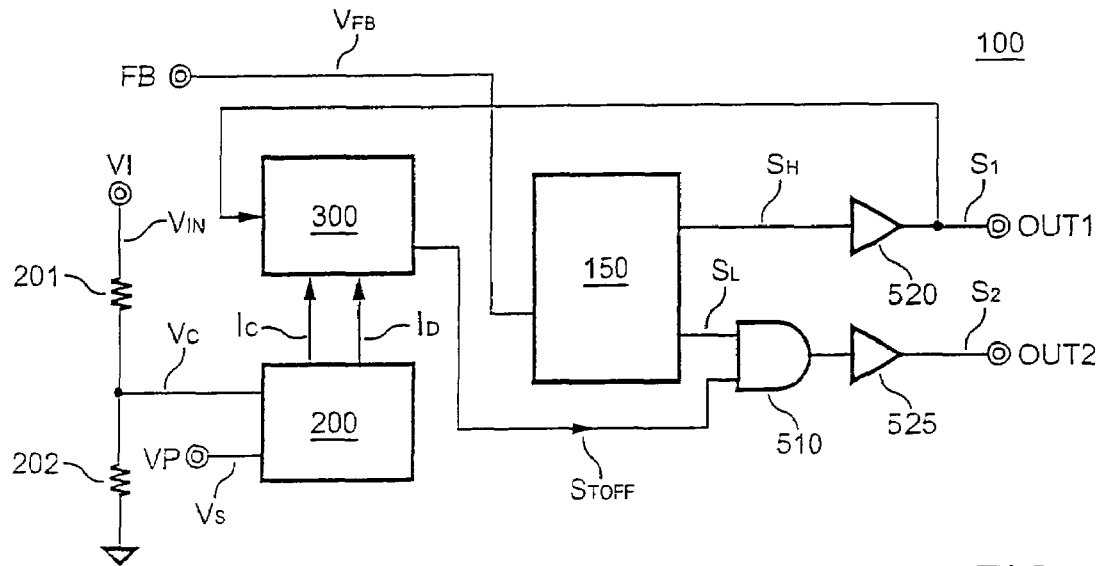
FIG. 7 shows a control circuit in accordance with a preferred embodiment of the present invention.

Reference is made to FIG. 6 and FIG. 7 shows the control circuit 100 according to a preferred embodiment of the present invention. A switching circuit 150 generates a high-side signal $S_H$ and a low-side signal $S_L$. The high-side signal $S_H$ is further connected to produce the first switching signal $S_1$ via an output buffer 520. The low-side signal $S_L$ is connected to generate the second switching signal $S_2$ through an AND gate 510 and an output buffer 525. An input circuit 200 and a timer circuit 300 form an evaluation circuit to generate a timing signal $S_{TOFF}$ in accordance with an input signal $V_C$, the control signal $V_S$, and the first switching signal $S_1$. The input signal $V_C$ is correlated to the input voltage $V_{IN}$. The timing signal $S_{TOFF}$ is utilized to turn off the second switch 20 for preventing a reverse current to the second switch 20 under light load and no load conditions.

The input circuit 200 generates a charge signal $I_C$ and a discharge signal $I_D$ in accordance with the input signal $V_C$ and the control signal $V_S$. Subsequently, the timer circuit 300 generates the timing signal $S_{TOFF}$ in accordance with the charge signal $I_C$, the discharge signal $I_D$, and the first switching signal $S_1$.

Figure 8:
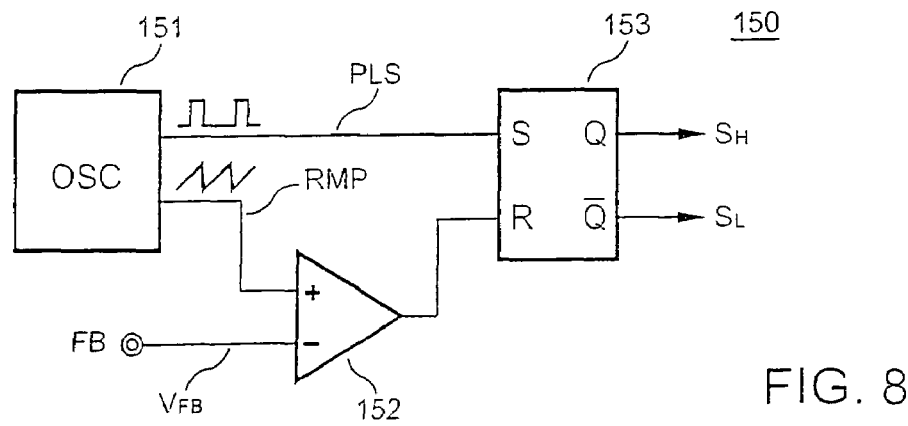
FIG. 8 shows a switching circuit for producing the switching signal for regulating the output of the switching regulator according to an embodiment of the present invention.

FIG. 8 shows the switching circuit 150 according to an embodiment of the present invention. It includes an oscillation circuit 151 for generating a periodic pulse signal PLS and a ramp signal RMP. The pulse signal PLS is connected to enable a flip-flop 153. The ramp signal RMP is connected to a comparator 152 to generate a reset signal to reset the flip-flop 153. Another input of the comparator 152 is connected to the feedback terminal FB to receive the feedback signal $V_{FB}$ for comparing with the ramp signal RMP. The outputs of the flip-flop 153 generate the high-side signal $S_H$ and the low-side signal $S_L$.

Figure 9:
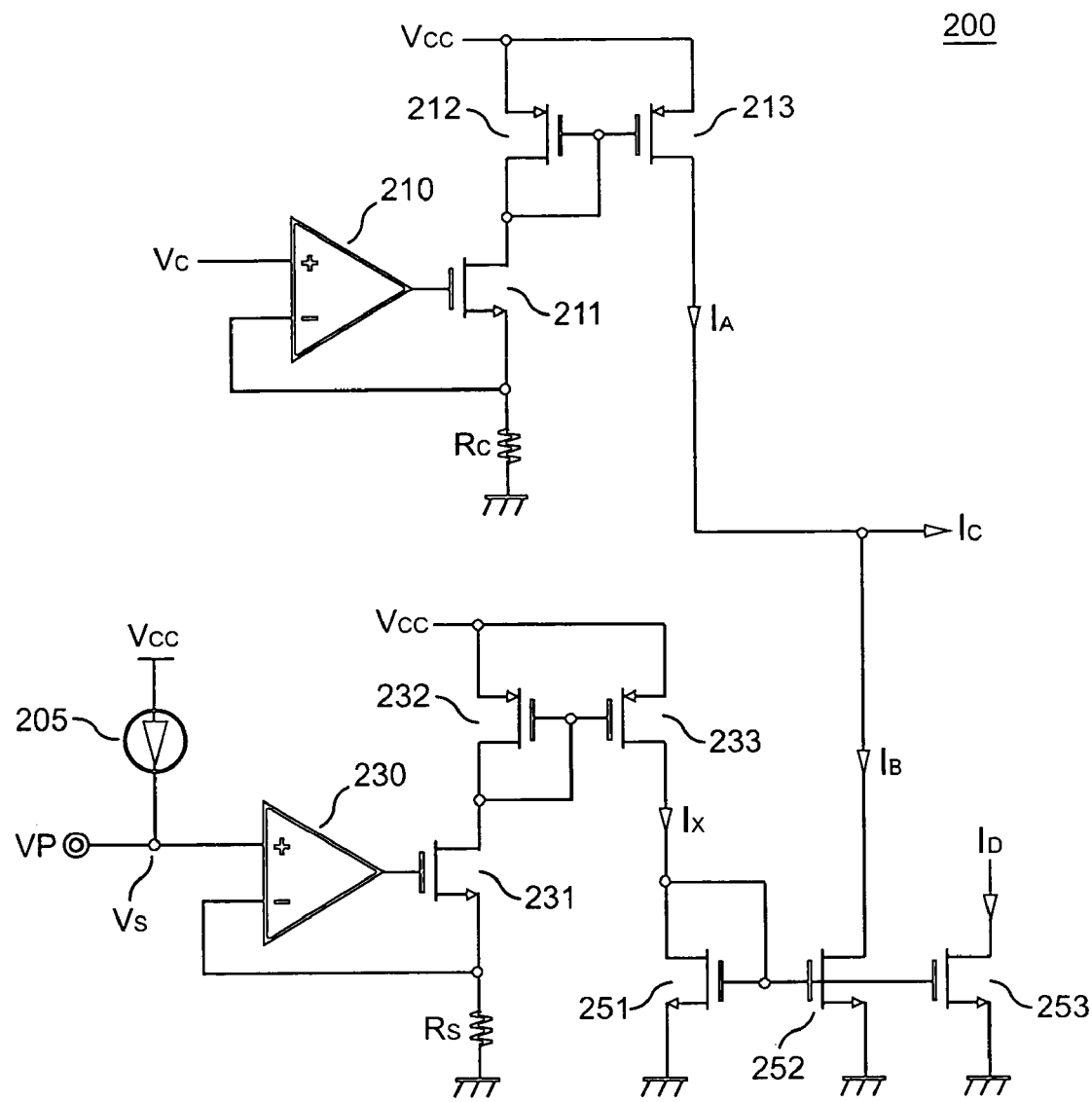
FIG. 9 shows an input circuit according to an embodiment of the present invention.

Reference is made to FIG. 6, FIG. 7 and FIG. 9 shows the input circuit 200 according to an embodiment of the present invention. It comprises a first V-to-I converter to generate an input current signal $I_A$ according to the input signal $V_C$. The input signal $V_C$ is produced from the input voltage $V_{IN}$ through a voltage divider formed by a plurality of resistors 201 and 202. An operational amplifier 210, a resistor $R_C$, and a plurality of transistors 211, 212, and 213 form the first V-to-I converter. A second V-to-I converter generates a control current signal in accordance with the control signal $V_S$. A current source 205 is connected to the program terminal VP associated with the resistor 70 through the program terminal VP to produce the control signal $V_S$. An operational amplifier 230, a resistor $R_S$, and a plurality of transistors 231, 232, 233 form the second V-to-I converter. Current mirrors formed by a plurality of transistors 251, 252 and 253 generate the charge signal $I_C$ and the discharge signal $I_D$ in accordance with the input current signal $I_A$ and the control current signal. Therefore, the charge signal $I_C$ is determined by the input signal $V_C$, the control signal $V_S$, and the resistors $R_C$, $R_S$. It can be expressed as $$I_C = \frac{V_C}{R_C} - \frac{V_S}{R_S} \quad (4)$$

The discharge signal $I_D$ is determined by the control signal $V_S$ and the resistor $R_S$. It can be shown as $$I_D = \frac{V_S}{R_S} \quad (5)$$

Figure 10:
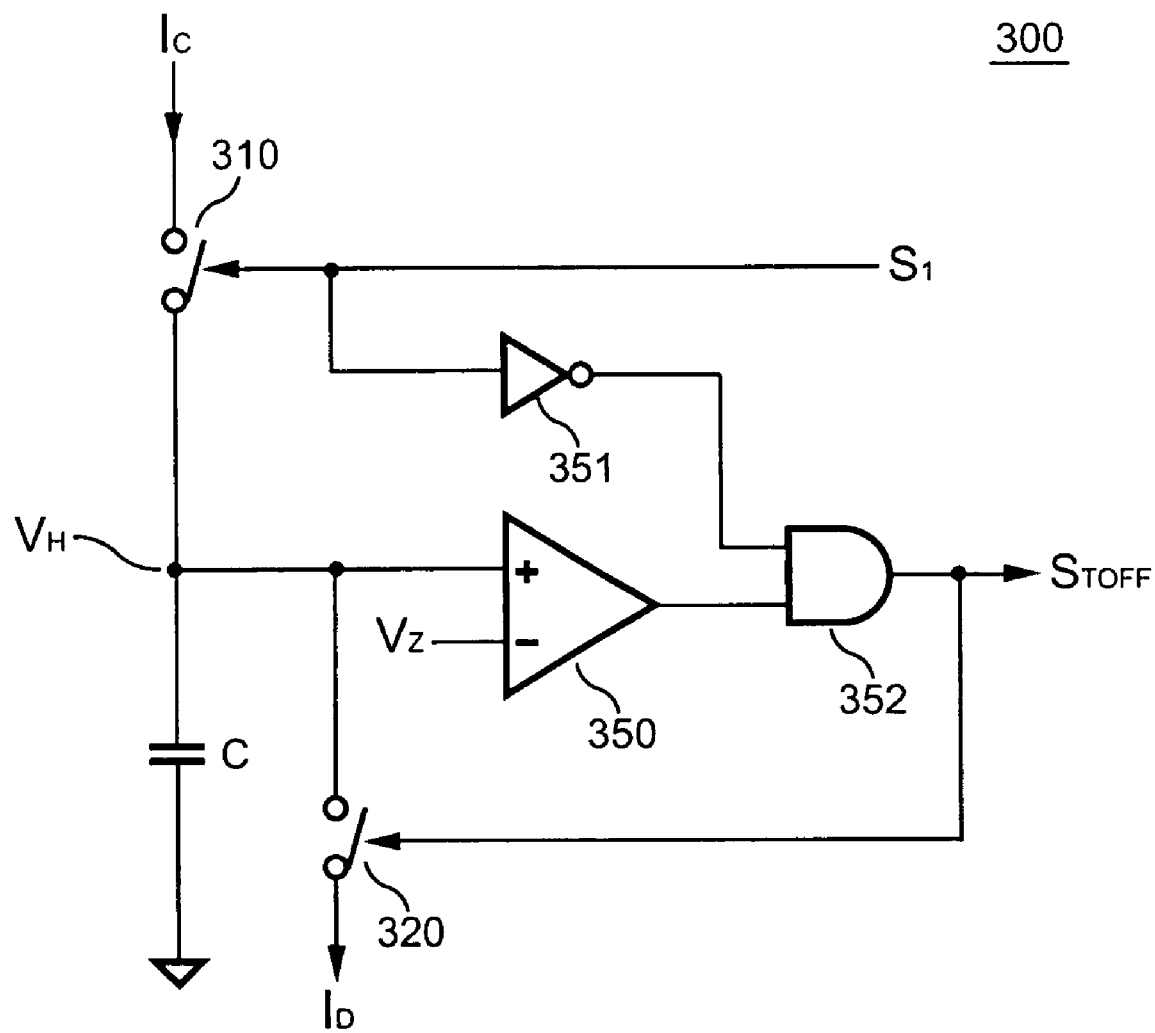
FIG. 10 shows a timer circuit according to an embodiment of the present invention.

FIG. 10 shows the timer circuit 300 according to an embodiment of the present invention. The charge signal $I_C$ and the first switching signal $S_1$ generate a charge voltage $V_H$. The charge voltage $V_H$ associated with the discharge signal $I_D$ generates the timing signal $S_{TOFF}$ once the first switching signal S1 is turned off. A charge switch 310 is coupled to the capacitor C to charge the capacitor C based on the charge signal $I_C$. The on/off of the charge switch 310 is controlled by the first switching signal $S_1$. A discharge switch 320 is coupled to the capacitor C to discharge the capacitor C based on the discharge signal $I_D$. The on/off of the discharge switch 320 is controlled by the timing signal $S_{TOFF}$. A comparator 350 is connected to the capacitor C to generate the timing signal $S_{TOFF}$ through an AND gate 352. The output of the comparator 350 is connected to an input of the AND gate 352. Another input of the AND gate 352 is connected to the switching signal $S_1$ via an inverter 351. The output of the AND gate 352 generates the timing signal $S_{TOFF}$. Therefore, the timing signal $S_{TOFF}$ is enabled in response to the turning off of the first switching signal $S_1$. Furthermore, the charge voltage $V_H$ is compared with a threshold $V_Z$, thereby disabling the timing signal $S_{TOFF}$. The charge voltage $V_H$ can therefore be shown as $$V_H = \frac{I_C}{C} \times T_{ON} = \frac{\frac{V_C}{R_C} - \frac{V_S}{R_S}}{C} \times T_{ON} \quad (6)$$

Using the value of the resistors $R_C$ and $R_S$ as the resistance R, and then the equation (6) can be rewritten as $$V_H = \frac{V_C - V_S}{R \times C} \times T_{ON} \quad (7)$$

The discharge time $T_{OFF}$ of the capacitor C is given by $$T_{OFF} = \frac{C \times V_H}{I_D} = \frac{C \times V_H}{\frac{V_S}{R}} \quad (8)$$

According to equations (7) and (8), the discharge time $T_{OFF}$ of the capacitor C can be designed as the discharge time $T_{OFF}$ of the inductor 30.

$$T_{OFF} = \frac{V_C - V_S}{V - S} \times T_{ON} \quad (9)$$

Assuming input signal $V_C$ is equal to $\alpha \times V_{IN}$, $V_S$ is equal to $\beta \times V_O$, and $\alpha$ is equal to $\beta$, $$T_{OFF} = \frac{\alpha \times V_{IN} - \beta \times V_O}{\beta \times V_O} \times T_{ON} = \frac{V_{IN} - V_O}{V_O} \times T_{ON} \quad (10)$$

in which $\alpha$ is a constant determined by the ratio of the resistors 201, 202; $\beta$ is a constant determined by the current mirrors ratio of the transistors 251, 252. Therefore, the timing signal $S_{TOFF}$ is increased in response to the increase of the input signal $V_C$. Furthermore, the timing signal $S_{TOFF}$ is decreased in response to the decrease of the switching signal $S_1$. The control signal $V_S$ is a programmable signal, and it can be set in accordance with the output voltage $V_O$ for the prediction of the discharge time $T_{OFF}$ of the inductor 30. Therefore the second switch 20 can be turned off in advance to prevent the generation of the reverse current.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A control circuit comprising:
   a switching circuit for generating a switching signal and an auxiliary signal, wherein the switching signal is used to regulate the switching regulator, and the auxiliary signal is used to control a synchronous rectifier; and
   an evaluation circuit for generating a timing signal in response to an input signal, a control signal, and the switching signal, wherein the timing signal is used for turning off the synchronous rectifier to prevent a reverse current to the synchronous rectifier, the input signal is related to the input voltage of the switching regulator, and the control signal is related to the output voltage of the switching regulator, wherein
   the evaluation circuit further comprising:
   an input circuit for generating a charge signal and a discharge signal in accordance with the input signal and the control signal; and
   a timer circuit for generating the timing signal in accordance with the charge signal, the discharge signal, and the switching signal, wherein the charge signal and the switching signal generate a charge voltage, and the charge voltage and the discharge signal generate the timing signal when the switching signal is turned off.

2. The control circuit as claimed in claim 1, wherein the timing signal is decreased in response to the decrease in the switching signal.

3. The control circuit as claimed in claim 1, wherein the timing signal is increased in response to the increase in the input signal.

4. The control circuit as claimed in claim 1, wherein the control signal is a programmable signal.

5. The control circuit as claimed in claim 1, wherein the synchronous rectifier is turned off once the timing signal is disabled.

6. The control circuit as claimed in claim 1, wherein the input circuit further comprising:
   a first V-to-I converter for generating an input current signal in accordance with the input signal;
   a second V-to-I converter for generating a control current signal in accordance with the control signal; and
   a plurality of current mirrors for generating the charge signal and the discharge signal in accordance with the input current signal and the control current signal.

7. The control circuit as claimed in claim 1, wherein the timer circuit further comprising:
   a capacitor for generating the charge voltage;
   a charge switch coupled to the capacitor to charge the capacitor based on the charge signal, in which the on/off of the charge switch is controlled by the switching signal;
   a discharge switch coupled to the capacitor to discharge the capacitor based on the discharge signal, wherein the on/off of the discharge switching is controlled by the timing signal; and
   a comparator coupled to the capacitor to generate the timing signal, wherein the timing signal is enabled in response to the turning off of the switching signal, and the charge voltage is compared with a threshold and the timing signal is disabled.

8. A method for predicting discharge time of magnetic device comprising:
   generating a switching signal and an auxiliary signal, wherein the switching signal is used for output regulation, and the auxiliary signal is used for synchronization; and
   generating a charge signal and a discharge signal in accordance with an input signal and a control signal, wherein the input signal is related to an input voltage; and
   generating a timing signal in accordance with the charge signal, the discharge signal, and the switching signal, wherein the timing signal is used to prevent a reverse current, the charge signal and the switching signal generate a charge voltage, and the charge voltage and the discharge signal generate the timing signal once the switching signal is turned off.

9. The method as claimed in claim 8, wherein the timing signal is decreased in response to the decrease of the switching signal, and the timing signal is increased in response to the increase of the input signal.

10. A circuit for predicting the discharge time of a magnetic device, comprising:
    an evaluation circuit to generate a timing signal in response to an input signal, a control signal, and a switching signal, wherein the timing signal represents the discharge time of the magnetic device, the input signal is related to input voltage of a switching regulator; the control signal is related to the output voltage of the switching regulator, and the on-time of the switching signal is related to the charge time of the magnetic device, wherein the evaluation circuit comprising:
an input circuit to generate a charge signal and a discharge signal in accordance with the input signal and the control signal; and
a timer circuit to generate the timing signal in accordance with the charge signal, the discharge signal, and the switching signal, wherein the charge signal and the switching signal generate a charge voltage, and the charge voltage and the discharge signal generates the timing signal once the switching signal is turned off.

11. The circuit as claimed in claim 10, further comprising:
a switching circuit for generating the switching signal and an auxiliary signal, wherein the switching signal is used for regulating the switching regulator, and the auxiliary signal is used to control a synchronous rectifier.

12. The circuit as claimed in claim 10, wherein the timing signal is decreased in response to the decrease of the switching signal, and the timing signal is increased in response to the increase of the input signal.

13. The circuit as claimed in claim 10, wherein the input circuit comprising:
a first V-to-I converter to generate an input current signal in accordance with the input signal;
a second V-to-I converter to generate a control current signal in accordance with the control signal; and
a plurality of current mirrors for generating the charge signal and the discharge signal in accordance with the input current signal and the control current signal.

14. The circuit as claimed in claim 10, wherein the timer circuit comprising:
a capacitor for generating the charge voltage;
a charge switch coupled to the capacitor to charge the capacitor based on the charge signal, in which the on/off of the charge switch is controlled by the switching signal;
a discharge switch coupled to the capacitor to discharge the capacitor based on the discharge signal, wherein the on/off of the discharge switch is controlled by the timing signal; and
a comparator coupled to the capacitor to generate the timing signal, wherein the timing signal is enabled in response to the turning off of the switching signal, the charge voltage is compared with a threshold, and the timing signal is disabled.

15. A circuit for predicting the discharge time of magnetic device, comprising:
an evaluation circuit to generate a timing signal in response to an input signal and a switching signal, wherein the timing signal represents the discharge time of the magnetic device, the input signal is related to input voltage of a switching regulator, and the on-time of the switching signal is related to the charge time of the magnetic device, wherein the evaluation circuit comprising:
an input circuit to generate a charge signal and a discharge signal in accordance with the input signal and a control signal; and
a timer circuit to generate the timing signal in accordance with the charge signal, the discharge signal, and the switching signal, wherein the charge signal and the switching signal generate a charge voltage, and the charge voltage and the discharge signal generate the timing signal once the switching signal is turned off.

16. The circuit as claimed in claim 15, wherein the timing signal is decreased in response to the decrease of the switching signal, and the timing signal is increased in response to the increase of the input signal.

17. The circuit as claimed in claim 15, wherein the control signal is a programmable signal.

18. The circuit as claimed in claim 15, wherein the input circuit comprising:
a first V-to-I converter to generate an input current signal in accordance with the input signal;
a second V-to-I converter to generate a control current signal in accordance with the control signal; and
a plurality of current mirrors for generating the charge signal and the discharge signal in accordance with the input current signal and the control current signal.

19. The circuit as claimed in claim 15, wherein the timer circuit comprising:
a capacitor for generating the charge voltage;
a charge switch coupled to the capacitor to charge the capacitor based on the charge signal, wherein the on/off of the charge switch is controlled by the switching signal;
a discharge switch coupled to the capacitor to discharge the capacitor based on the discharge signal, wherein the on/off of the discharge switching is controlled by the timing signal; and
a comparator coupled to the capacitor to generate the timing signal, wherein the timing signal is enabled in response to the turning off of the switching signal, the charge voltage is compared with a threshold, and the timing signal is disabled.

* * * * *